United States Patent [19]

Olson

[11] Patent Number: 5,054,690

[45] Date of Patent: Oct. 8, 1991

[54] DRIP IRRIGATION MULTI-OUTLET EMITTER HEAD ASSEMBLY

[76] Inventor: Donald O. Olson, 1935 Altozana Dr., El Cajon, Calif. 92020

[21] Appl. No.: 495,437

[22] Filed: Mar. 16, 1990

[51] Int. Cl.⁵ ............................ B05B 1/14; B05B 15/00
[52] U.S. Cl. ................................... 239/542; 239/602; 239/553.3; 405/39; 405/43
[58] Field of Search ............... 239/542, 533.13, 602, 239/553.3, 568; 405/39–41, 43

[56] References Cited

U.S. PATENT DOCUMENTS

| | | | |
|---|---|---|---|
| 1,010,819 | 12/1911 | Thompson | 405/39 X |
| 3,767,124 | 10/1973 | Spencer | 239/542 |
| 3,863,845 | 2/1975 | Bumpstead | 239/542 |
| 4,058,257 | 11/1977 | Spencer | 239/542 X |
| 4,193,545 | 3/1980 | Havens | 239/542 X |
| 4,509,692 | 4/1985 | Moss | 239/542 |
| 4,589,595 | 5/1986 | Havens | 239/547 |
| 4,613,080 | 9/1986 | Benson et al. | 239/542 |
| 4,660,769 | 4/1987 | Rosenberg | 239/542 |
| 4,726,527 | 2/1988 | Mendenhall | 239/542 |
| 4,765,541 | 8/1988 | Mangels et al. | 239/542 X |

OTHER PUBLICATIONS

Olson Irrigation Systems Brochure, Dec. 1, 1989.

Primary Examiner—Andres Kashnikow
Assistant Examiner—William Grant
Attorney, Agent, or Firm—Owen, Wickersham & Erickson

[57] ABSTRACT

A drip irrigation emitter head assembly is described which comprises a body member having a tubular inlet portion adapted to connect with a water supply conduit. The body member includes a circular wall surrounding the tubular inlet portion forming a plurality of passages having open upper and lower ends. A flow control device in each passage forms a constricted emitter orifice. A cap connected to the body member covers both the tubular inlet portion and the surrounding upper ends of the passages. A removable filter retained between the cap and the body member filters water before it enters the passages at their upper ends. Flexible distribution tubes are connected to the lower ends of at least some of the passages in the body member for carrying fluid to preselected locations at their outer ends.

10 Claims, 3 Drawing Sheets

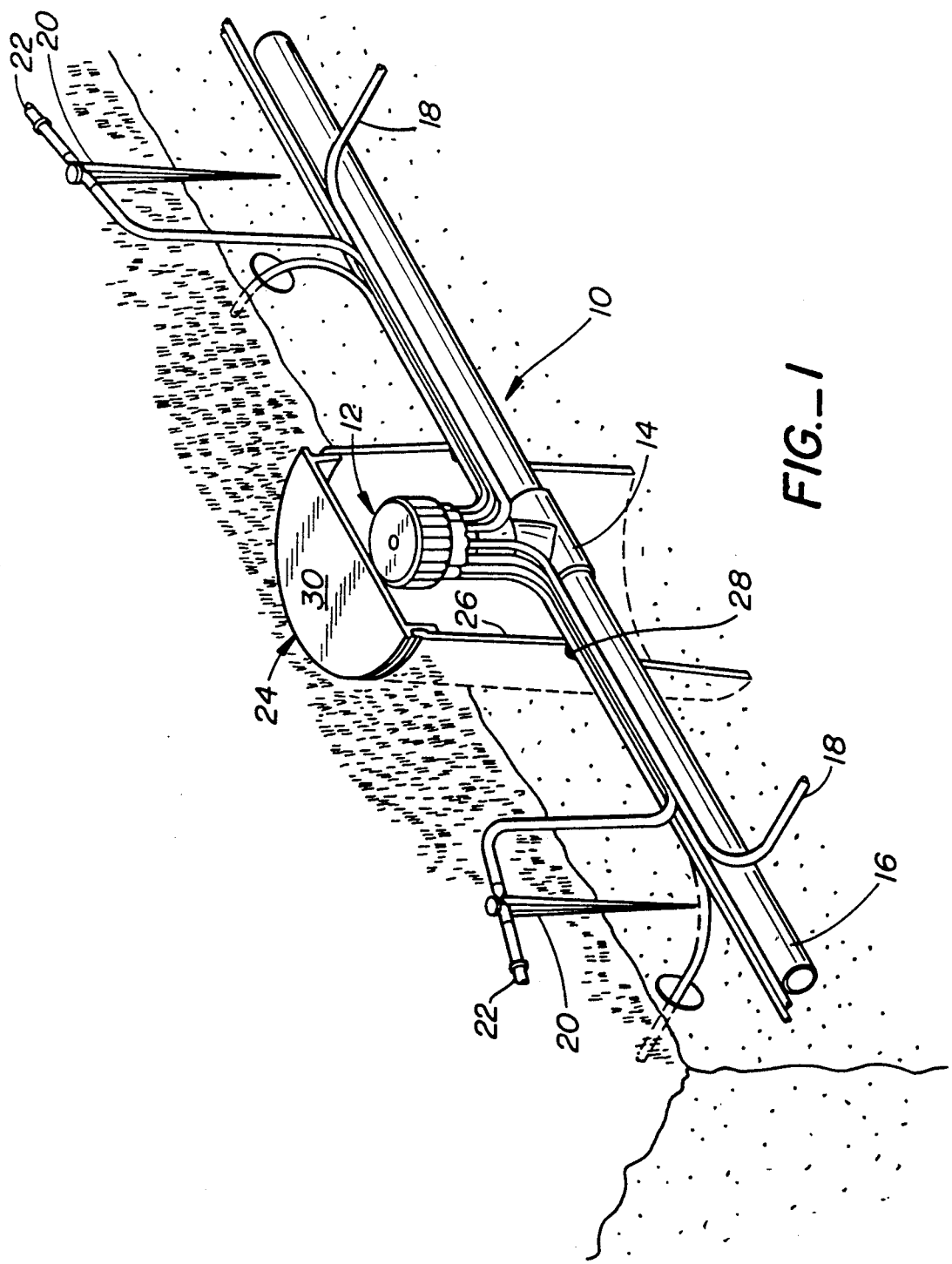
FIG._1

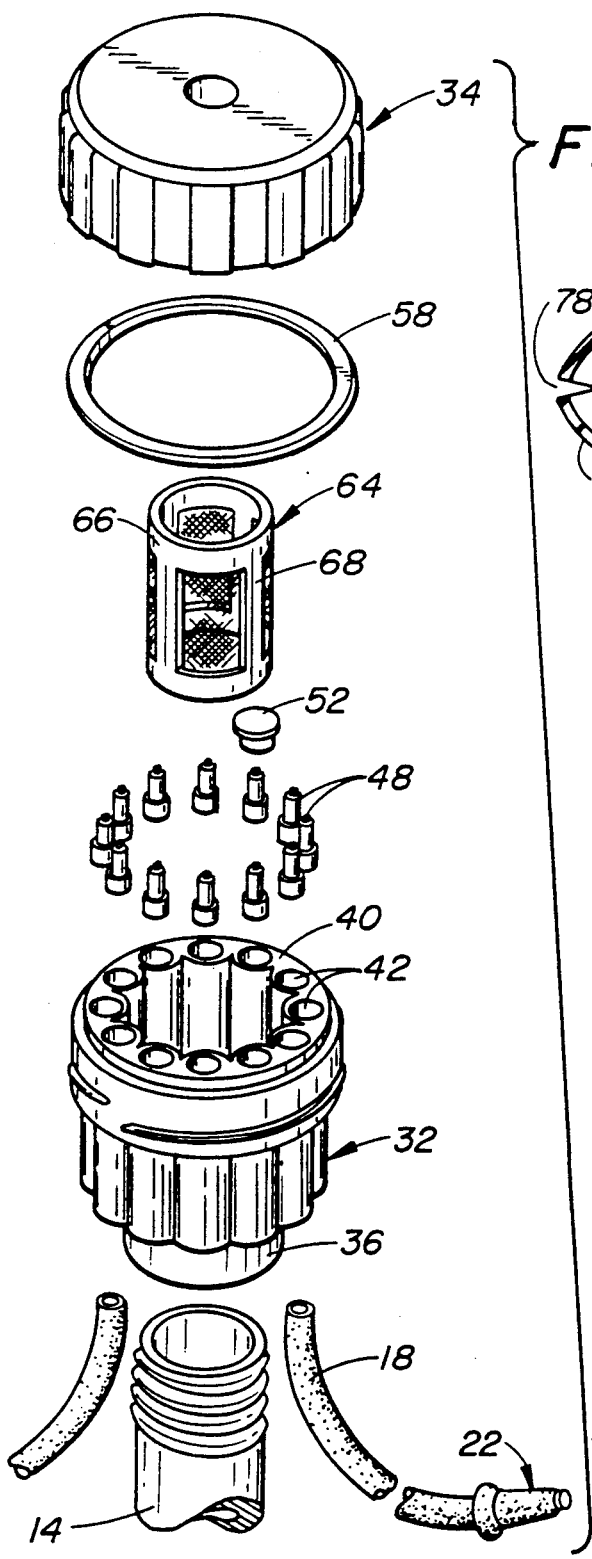
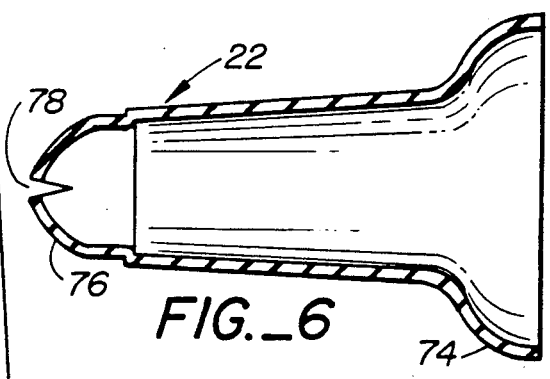
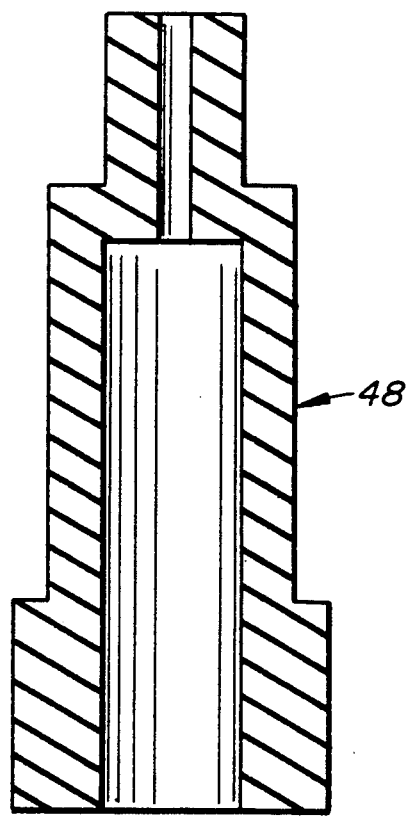
FIG._2
FIG._6
FIG._5

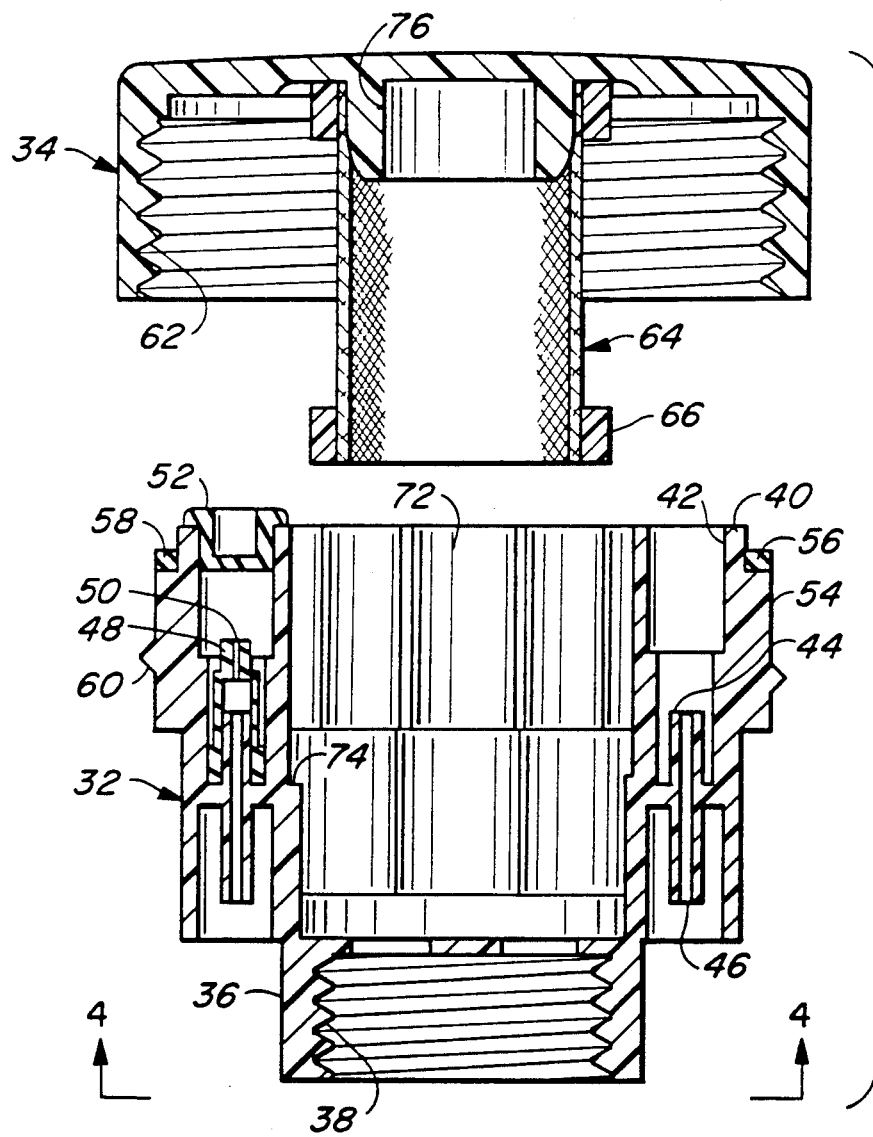
FIG._3
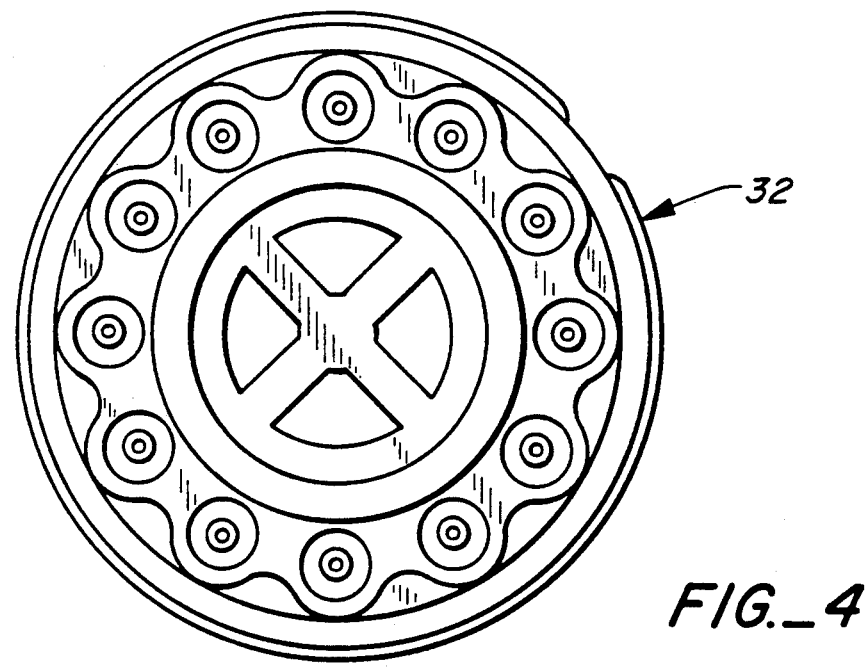
FIG._4

DRIP IRRIGATION MULTI-OUTLET EMITTER HEAD ASSEMBLY

This invention relates to drip irrigation systems and more particularly to a multi-outlet head for distributing water and other materials such as fertilizers, weed-killer substances and fungicides to a plurality of emitters.

BACKGROUND OF THE INVENTION

In drip irrigation systems it is often desirable to furnish water to several emitters in the same general area from a common water supply source. Also, in drip irrigation systems it is preferable to filter the water to prevent the emitters from clogging or providing erratic flow rates. Further, it is often necessary to provide means in a drip irrigation system for supplying additives to the water such as fertilizers or pest control chemicals. A general object of the present invention is to provide a drip irrigation device that provides all of the aforesaid requirements.

Another object of the invention is to provide a drip irrigation apparatus with a multi-outlet head for controlling flow to a plurality of emitters that can be easily installed with unskilled labor either above or below the ground level.

Still another object of the invention is to provide a multi-emitter drip irrigation apparatus that is particularly well adapted for ease and economy of manufacture.

SUMMARY OF THE INVENTION

In accordance with the principles of the invention an emitter head is provided which is comprised of a body and a cap. The body has a central tubular section which is adapted to be attached to a water supply source and surrounding the tubular section are a series of circumferentially spaced apart outlet passages. Each passage has a means for retaining an emitter element with an orifice of a preselected size for controlling the flow rate. At the lower end of each passage is a cylindrical receptacle for receiving one end of a distribution tube which may be of any suitable length.

The upper end of the emitter head body forms a larger receptacle for retaining an annular filter element having a fine mesh screen wall. The upper end of the filter element is held in place by the cap when the cap is threadedly attached to the emitter body. When the emitter apparatus is assembled, water from the supply source flows upwardly within the emitter head, through the filter wall which blocks any solid particles, and into the surrounding emitter outlets. Each outlet is supplied with an emitter insert that provides the desired flow rate and if any outlet is not used it is closed by a removable outlet plug. The emitter head is preferably installed just below the ground surface and is surrounded by a protective access box. The distribution tubes connected to the emitter head may be placed in any suitable position so as to reach a plant requiring irrigation, and the outer end of each distribution tube is preferably supplied with a bug cap to prevent the intrusion of insects into the tube.

Other objects, advantages and features of the invention may become apparent from the following detailed description of one embodiment thereof, presented in conjunction with the accompanying drawing.

BRIEF DESCRIPTION OF THE DRAWING

FIG. 1 is a view in perspective of a drip irrigation apparatus embodying principles of the present invention as it appears in a typical installation.

FIG. 2 is an exploded view in perspective showing components of the apparatus of FIG. 1.

FIG. 3 is an exploded view in elevation and in section of the cap and body components of the drip irrigation apparatus according to the invention.

FIG. 4 is a bottom view of the apparatus taken at line 4—4 of FIG. 3.

FIG. 5 is an enlarged view in elevation in section of a flow rate adapter for use in the apparatus of FIGS. 1-3.

FIG. 6 is an enlarged fragmentary view of an end plug for an emitter tube.

DETAILED DESCRIPTION OF EMBODIMENT

With reference to the drawing, FIG. 1 shows a drip irrigation apparatus 10 embodying principles of the present invention as it appears in a typical installation for providing irrigation to a plurality of nearby plants. In general, the apparatus comprises an emitter head assembly 12 which is connected to a T-fitting 14 in a water conduit 16 extending from a water supply source (not shown). Extending from the head 12 are a plurality of distribution tubes 18 which extend to various nearby locations that require irrigation. As indicated, the distribution tubes 18 may extend to locations either on, above or below the ground surface. If they are brought above the ground level they may be supported near their outer end by stake 20. At the end of each distribution tube is an attached bug cap 22 which prevents the intrusion of insects or dirt, as shown in greater detail in FIG. 6.

The emitter head assembly 12 can readily be attached to a water conduit 16 such as one previously installed for conventional sprinkler systems, and generally it is located just below the ground surface. An emitter access box 24 may be provided to surround and protect the emitter head assembly and make it easily accessible for servicing. The box 24, which may be made of a suitable plastic material, has outer wall 26 that is cylindrical with slots 28 on opposite sides to accommodate the conduit 16. A flat circular top 30 is connected to the outer wall to form a protective enclosure for the head.

As shown in FIGS. 2 and 3, the emitter head assembly 12 is comprised of a main body 32 and a screw-on cap 34 that fits over the top of the body. The body 32 has a central tubular portion 36 that extends downwardly and has internal threads 38 so it can be readily attached to the threaded male fitting 14 in the supply conduit 16. Around the upper end of the tubular portion 36 is an upper head wall portion 40 forming a circular series of circumferentially spaced apart cylindrical passages 42. Each passage has a central concentric integral sleeve member 44 having an orifice 46 of a preselected size. The upper end of each sleeve member 44 is sized to receive an emitter adapter 48 which has a smaller orifice 50 than the sleeve member 44. These emitter adapters 48, shown in FIG. 5, are similar in function to emitter elements shown in U.S. Pat. Nos. 4,193,545 and 4,589,595.

As also shown in FIG. 3, the orifice 50 of each adapter 48 is smaller than the orifice 46 so that a reduced flow rate can be established in selected passages by attaching an adapter 48 to the sleeve member 44 therein.

If a particular passage 42 will not be required for a particular installation of the emitter head 10, a plug 52, shown in FIG. 3, can be inserted at the upper end of the passage to block it.

The wall portion 40 of the body 32 has an outer cylindrical portion 54 which forms an annular shoulder 56 that provides a seat for a gasket 58. A series of male threads 60 are provided on the surface of the outer cylindrical portion 54 and these threads cooperate with mating threads 62 on the inside of cap 34 to secure the cap in place on the body 32.

Water supplied to most irrigation systems contains particles of dirt that can easily clog drip emitters. In the present invention, a filter 64 is provided which removes all particles that are larger than around 75 microns and is used in the emitter head assembly. As shown in FIGS. 2 and 3, the filter has a cylindrical configuration and is preferably comprised of a plastic frame having circular members 66 at its opposite ends that are connected by spaced apart longitudinal members 68. Between the longitudinal members are areas covered by a fine mesh screen material 70 which removes particles larger than 75 microns from the water.

The lower end of the filter 64, as shown in FIG. 3, fits within a cylindrical recess 72 formed within the wall 40 and its circumferentially spaced apart passages 42. The lower end of the filter 64 is supported on a shoulder 74 formed on the internal surface of the tubular head portion 36. The upper end of the filter 64 fits over a cylindrical boss 76 which is integral with and extends concentrically downwardly from the inside of the cap 34.

When the emitter head 12 is assembled for use, the necessary flow adapters 48 are inserted into one or more passages 42, if needed; the filter 64 is inserted into the cylindrical space 72 in the main body 32 of the emitter head; and the cap 34 is threaded onto the main body. The emitter head assembly 12 can then be threadedly attached to the conduit fitting 14. The distribution tubes 18 are attached to the bottom end of the main body 32, each tube fitting within the lower end 43 of a passage 42 and also around the lower end of a sleeve member 44 within the passage. An important feature of the invention is the fact that the distribution tubes 18 extend from the bottom end of the body member 32 in the opposite direction of the incoming water through the tubular portion 36. Thus, the distribution tubes do not project out of the body member 32 like a car distributor cap, but are directed downwardly so as to be more easily positioned and protected. With distribution tubes 18 of the desired length attached to each of the emitter head passages, a preselected irrigation pattern can be established. Water supplied through the lower end of the main body 36 must flow through the filter 64 before entering each emitter passage 42. The water is thus filtered and metered within each passage 42 at the desired flow rate to each of the distributor tube terminal locations.

As shown in FIG. 2, the terminal end of each distribution tube 18 may be provided with a bug prevention plug 22. As shown in greater detail in FIG. 6, each bug cap which is molded from a moderately flexible rubber-like material, has an open end 74 which fits into or over the end of a tube 18. The other end 76 is closed except for an elongated slit opening 78. Normally the slit opening is closed to prevent insects from entering the tube, but it allows the outward flow of water when such flow occurs.

To those skilled in the art to which this invention relates, many changes in construction and widely differing embodiments and applications of the invention will make themselves known without departing from the spirit and scope of the invention. The disclosure and the description herein are purely illustrative and are not intended to be in any sense limiting.

WHAT IS CLAIMED IS:

1. A drip irrigation emitter head assembly comprising:
    a body member having a tubular inlet portion for connection with a water supply conduit;
    circular wall mans surrounding said tubular inlet portion forming a plurality of passages having open upper and lower ends;
    flow control means in each said passage forming a constricted emitter orifice;
    cap means connected to said body member covering said tubular inlet portion and surrounding said upper ends of said passages;
    filter means retained between said cap means and said body member for filtering water before it enters said passages at their upper ends; and
    flexible distribution tubes having inner and outer ends, said inner ends being connected to the lower ends of at least one of said passages in said body member for carrying fluid to preselected locations at the outer ends of said tubes.

2. The emitter head assembly of claim 1 wherein both said body member and said cap means are molded plastic elements.

3. The emitter head assembly of claim 1 wherein said passages are parallel to and circumferentially spaced a radial distance from the axial centerline of said body member.

4. The emitter head assembly of claim 1 wherein said flow control means in each said passage includes an integral tube providing a restricted orifice and for reclining a flow reducing adaptor.

5. The emitter head assembly of claim 1 wherein said circular wall means includes an outer portion forming an annular shoulder on said body member and a gasket on said shoulder retained by said cap means.

6. The emitter head assembly of claim 5 including thread means on said wall means and mating thread means on said cap means.

7. The emitter head assembly of claim 1 including a plug means with an elongated slit opening in the outer end of each said distribution tube for preventing the entry of insects through said plug means.

8. The emitter head assembly of claim 1 wherein said filter means comprises a tubular member having frame portions forming upper and lower open ends and side spaces covered by a fine mesh screen between said frame portions.

9. The emitter head assembly of claim 8 wherein said circular wall means in said body member forms a cylindrical recess adjacent said tubular inlet portion for receiving said filter means.

10. The emitter head assembly of claim 8 including a cylindrical boss member on the inside of said cap means for retaining said upper end of said filter means.

* * * * *